US011912553B2

(12) United States Patent
Schoenfelder

(10) Patent No.: US 11,912,553 B2
(45) Date of Patent: Feb. 27, 2024

(54) APPARATUS FOR CLOSING A CONTAINER WITH A CONTAINER CLOSURE

(71) Applicant: KRONES AG, Neutraubling (DE)

(72) Inventor: Markus Schoenfelder, Neutraubling (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 18/062,762

(22) Filed: Dec. 7, 2022

(65) Prior Publication Data

US 2023/0174361 A1 Jun. 8, 2023

(30) Foreign Application Priority Data

Dec. 8, 2021 (DE) ..................... 10 2021 132 348.7

(51) Int. Cl.
*B67B 3/20* (2006.01)

(52) U.S. Cl.
CPC .......... *B67B 3/2066* (2013.01); *B67B 3/2013* (2013.01)

(58) Field of Classification Search
CPC ........ B67B 3/2066; B67B 3/2013; B67B 3/06
USPC ........................................................... 53/317
See application file for complete search history.

(56) References Cited

U.S. PATENT DOCUMENTS 5,417,031 A * 5/1995 Bankuty ............... B67B 3/2033
53/331.5

FOREIGN PATENT DOCUMENTS

| | | | | |
|---|---|---|---|---|
| DE | 102019103095 A1 * | 8/2020 | ............... B67B 1/00 |
| EP | 1772421 A1 * | 4/2007 | ........... B67B 3/2066 |
| EP | 2 724 976 B1 | 4/2016 | |
| EP | 3647256 | 5/2020 | |

OTHER PUBLICATIONS

Extended European Search Report dated May 22, 2023 from corresponding application No. EP 22212112.1, 7 pages.
Office Action for German Patent Application No. DE 102021132348.7 dated Oct. 30, 2023; 6 pages.

* cited by examiner

*Primary Examiner* — Jacob A Smith
(74) *Attorney, Agent, or Firm* — Haynes and Boone, LLP

(57) ABSTRACT

An apparatus for closing a container with a container closure, for example for closing a drinks container with a roll-on closure, a screw type closure, a press-on closure, a crown cap and/or a press-in closure, comprising a lifting unit which can be displaced in a longitudinal direction and which has a guide unit for predetermining a position of the lifting unit in the longitudinal direction and a closure receiving member which is connected to the lifting unit via a pretensioning device for retaining a container closure and for applying the container closure to a container opening of a container which is intended to be closed with a head pressure which is predetermined by the pretensioning device, and an adjustment apparatus for automatically adjusting the head pressure which is predetermined by the pretensioning device; it further relates to a closure member which comprises an above-mentioned apparatus.

19 Claims, 11 Drawing Sheets

APPARATUS FOR CLOSING A CONTAINER WITH A CONTAINER CLOSURE

CROSS-REFERENCE TO RELATED APPLICATIONS

This application claims priority from German Patent Application No. DE 10 2021 132 348.7, filed on Dec. 8, 2021 in the German Patent and Trademark Office, the disclosure of which is incorporated herein by reference in its entirety.

BACKGROUND

Technical Field

The present invention relates to an apparatus for closing a container with a container closure, for example, for closing a drinks container with a roll-on closure, a screw type closure, a press-on closure, a crown cap and/or a press-in closure and a closure member which comprises such an apparatus.

Related Art

When drinks are bottled in drinks filling installations, generally containers which are intended to be filled are filled with a filling product, for example, a drink. After the filling operation, the filled container is closed with a container closure.

Depending on the type of container to be filled, different types of container closures are known. Thus, for example, it is known to close drinks bottles with a roll-on closure. In this case, a closure blank which is generally made from aluminum and which is in the form of a unilaterally closed hollow cylinder is placed on a container opening which is provided with an external thread with a specific predetermined head pressure being applied. The hollow-cylindrical lateral face of the closure receives its definitive shape with a thread and flanged securing ring only during the closing operation after the blank has been placed on the container opening and is pressed against the opening by means of the head pressure.

Alternatively, drinks containers can be closed with a screw type closure. To this end, an already preformed screw type closure which is, for example, in the form of a plastics shaped component, is screwed onto a thread which is provided on the container opening by simultaneously rotating the closure and applying a specific predetermined head pressure.

It is further known to close a drinks container with a press-on closure. In this instance, the container closure is pressed with a specific predetermined head pressure on a container opening. For example, a drinks bottle can be closed with a plastics press-on closure or a crown cap.

Alternatively, drinks containers can also be closed by means of a press-in closure, for example, a cork or a stopper. In this case, the diameter of the cork or stopper is pressed together and pressed out of the closure receiving member, the so-called cork compressor, into the bottle opening by applying a specific predetermined head pressure via a closing stamp which is arranged in the closure receiving member.

For the above-mentioned different types of container closures, differently constructed closure receiving members, also known as closure heads, which each take account of the requirements of the respective type of container closure, the container to be closed and the operating method for applying the respective container closure to the filled container are necessary.

Thus, it is known to provide a closure member in a drinks filling installation in order to close a container with a container closure, which closure member can be equipped with different closure receiving members so that alternatively different types of container closures can be processed. In order to provide economic operation, which depends particularly on a throughput which must be achieved, that is to say, a number of containers which must be achieved and which are closed per time unit with a container closure, closure members generally have a plurality of apparatuses which are provided with a closure receiving member for closing a container with a container closure, and are constructed either as a linear construction type or as a rotary construction type. In closure members which are constructed in this manner, for example, it is accordingly possible to change between processing screw type closures and processing crown caps by the closure receiving members which are constructed to process screw type closures being disassembled from the apparatuses and being replaced by closure receiving members which are constructed to process crown caps. Alternatively, the closure receiving member can also be constructed to be able to receive and to process different types of container closures, for example, screw type closures and roll-on closures.

In order to provide the head pressure, which is necessary to apply the closures, the apparatuses further each have a pretensioning device, by means of which the closure receiving member is pretensioned with respect to a lifting unit of the apparatus in the direction towards the container which is intended to be closed.

The head pressure which is intended to be applied for closing a container with a container closure is different for each type of container closure. For example, it may be necessary to construct the apparatuses of the closure member when a plastics screw type closure is applied in such a manner that, for example, a head pressure of 150 N is provided for the closing operation. In a system for applying a roll-on closure (made of aluminium), the head pressure which has to be provided during the closing operation must be changed, for example, to 2000 N. In the systems, the head pressure is configured to the minimum force required and can currently be adjusted manually in order to further increase the head pressure (for example, by another 500 N).

In order to allow such a change of the head pressure, conventional pretensioning devices have a manual head pressure adjustment. For example, during retrofitting from processing of a first type of container closure to another type of container closure, a compression spring, which is provided in the apparatus, of the pretensioning device can be replaced by a compression spring with a different resilient rigidity in order thus to change the head pressure which is provided by the pretensioned compression spring. Alternatively a spring excursion of the compression spring can be manually adjusted during the retrofitting so that the compression spring has a different starting compression for the different types of container closure, for example, via a thread system which is provided in the pretensioning device.

Such manual retrofitting is complex because the pretensioning device, particularly the compression spring thereof, is poorly accessible. Furthermore, there is the risk that damage may be caused to the thread during adjustment if the process is manually carried out too often or incorrectly. Furthermore, a manual adjustment in installations which have a high throughput and which are constructed to be large and to have a large number of apparatuses for closing a container with a container closure is very time-intensive so that comparatively long downtimes result during retrofitting.

As a result, adaptation of the head pressure during retrofitting is often dispensed with and instead work is carried out with a fixed, mean "standard head pressure", although different head pressures are really required for different containers and container closures, which often again has disadvantageous effects on the closing process.

SUMMARY

An improved apparatus for closing a container with a container closure, for example for closing a drinks container with a roll-on closure, a screw type closure, a press-on closure, a crown cap and/or a press-in closure, and an improved closure member for closing a container with a container closure, for example for closing a drinks container with a roll-on closure, a screw type closure, a press-on closure, a crown cap and/or a press-in closure are described herein according to various embodiments.

Accordingly, there is proposed an apparatus for closing a container with a container closure, for example for closing a drinks container with a roll-on closure, a screw type closure, a press-on closure, a crown cap and/or a press-in closure, comprising a lifting unit which can be displaced in a longitudinal direction and which has a guide unit for predetermining a position of the lifting unit in the longitudinal direction and a closure receiving member which is connected to the lifting unit via a pretensioning device for retaining a container closure and for applying the container closure to a container opening of a container which is intended to be closed with a head pressure which is predetermined by the pretensioning device.

The apparatus further comprises an adjustment apparatus for automatically adjusting the head pressure which is predetermined by the pretensioning device.

The term "automatically adjusting" is intended to be understood in this instance to mean that the adjustment apparatus is constructed in such a manner that it operates correctly without direct human action, consequently, without manual intervention by a human being, brings about an adjustment or change of the head pressure. Thus, the adjustment or change of the head pressure can be carried out at the apparatus without any action at the apparatus by a human being.

In that the apparatus comprises an adjustment apparatus for automatically adjusting the head pressure which is predetermined by the pretensioning device, it is possible, without any manual action, always to be able to adjust the head pressure which is ideally intended to be applied for the container closure which is currently intended to be processed. As a result of the manual adjustment being dispensed with, expenditure of time which is otherwise necessary for this purpose can be saved, particularly because no person has to move directly into the region of the apparatus and consequently has to pass through the protection apparatuses which surround the apparatus, for example, in the form of a filling chamber, a clean room and/or barriers to prevent access from the exterior.

In that no direct human action is necessary, the expenditure necessary for hygiene in the apparatus can also be reduced because no contamination of the installation has to be feared as a result of the automatic adjustment of the head pressure.

Furthermore, the head pressure can be adjusted particularly precisely to the intended value. Furthermore, in particular incorrect adjustments as a result of human error, as may occur with a manual adjustment, can also be prevented.

Monitoring, checking and/or readjusting the head pressure during operation of the installation are thereby enabled. According to another embodiment, the apparatus comprises a retention member for connection to a closure transport apparatus, for example, a closure carousel, wherein the lifting unit is arranged on the retention member so as to be displaceable in the longitudinal direction.

In order to allow simple adjustment of the head pressure which is provided by the pretensioning device, the pretensioning device may comprise an adjustment element which can be displaced in the longitudinal direction relative to the lifting unit and/or a compression spring element which is arranged between the adjustment element and the closure receiving member in order to provide the predetermined head pressure on the closure receiving member.

In some embodiments, a position of the adjustment element in the longitudinal direction can be adjusted by the adjustment apparatus.

In order to predetermine a position of the lifting unit in the longitudinal direction which generally corresponds to a height position relative to gravitational acceleration, the lifting unit can comprise the guide unit in order to predetermine a position of the lifting unit in the longitudinal direction. The guide unit of the lifting unit in one or more embodiments has a guide element, for example, in the form of a guide roller which can be guided along or by a guide apparatus, for example, a lifting cam, of the closure member which has the apparatus.

It has been found to be advantageous for the pretensioning device to be arranged on the guide unit. In some embodiments, the adjustment element is retained on the guide unit in a displaceable manner.

A particularly simple and simultaneously stable construction of the pretensioning device can be achieved if the adjustment element is in the form of an adjustment rod and/or if the adjustment element has a threaded portion, via which the adjustment element is engaged with a threaded member of the pretensioning device.

Alternatively or additionally, the adjustment element can be retained in a rotationally secure manner relative to the longitudinal direction on the lifting element, in certain embodiments on the guide unit of the lifting element. The term "in a rotationally secure manner relative to the longitudinal direction" is intended to be understood to mean here that the adjustment element is prevented from rotating about the longitudinal direction as a rotation axis.

Such a rotation prevention member may be provided, for example, in that the adjustment element has a cross sectional profile with a non-circular shape, for example, a polygon profile, at least in a predetermined region when viewed perpendicularly to the longitudinal direction. Alternatively or additionally, an additional securing element, for example, a pin which is received in a receiving member, can be provided for providing the rotation prevention.

If there is provision for being able to adjust a pretensioning of the pretensioning device and/or the head pressure which is predetermined by the pretensioning device in a particularly accurate manner, the apparatus can comprise a measuring unit for establishing the pretensioning of the pretensioning device and/or the head pressure which is predetermined by the pretensioning device. In various embodiments, the measuring unit is constructed and configured to at least temporarily establish the head pressure at the lifting unit or the closure receiving member. In several embodiments, the measuring unit or a control/regulation apparatus connected to the measuring unit can be configured to establish a characteristic pretensioning line, for example, a characteristic resilient line for different adjustments of the adjustment apparatus, from the data which are provided via the measuring unit, in some embodiments over a predetermined range. In various embodiments, the established current head pressure and/or the established characteristic line can be displayed on a display at the apparatus and/or stored in a store. In particular, production tolerances of one or more of the components of the pretensioning device can thus be considered. For example, if the pretensioning device comprises a compression spring, for example, there may be 10% deviation with regard to a resilient rigidity within an obtained batch of compression springs.

According to another embodiment, the pretensioning device has an adjustment wheel for adjusting the head pressure, for example for adjusting the position of the adjustment element in the longitudinal direction relative to the lifting unit.

In one or more embodiments, the adjustment wheel and the adjustment element are connected in such a manner that the adjustment element can be displaced relative to the lifting unit in the longitudinal direction by the adjustment wheel being rotated about a rotation axis of the adjustment wheel.

A particularly simple construction can be achieved if the adjustment wheel is in the form of a friction wheel.

According to another embodiment, the pretensioning device comprises a gear mechanism, for example a bevel gear mechanism or a in one embodiment crosswise belt gear mechanism, wherein in certain embodiments the gear mechanism is arranged between the adjustment wheel and the adjustment element, wherein in some embodiments the gear mechanism provides a connection of the adjustment wheel and the adjustment element, wherein in several embodiments a threaded member which is engaged with a threaded portion of the adjustment element is provided on a gearwheel, in one embodiment a bevel gear, of the gear mechanism.

Alternatively, the gear mechanism may also be in the form of a worm gear pair. In various embodiments, in this instance, a worm of the worm gear pair is provided at the side of the adjustment wheel or is rotationally connected to the adjustment wheel which is engaged with a worm gear which is arranged at the side of the adjustment element. In this case, the worm gear in some embodiments constitutes the gearwheel which is engaged via a threaded portion, for example an internal thread, with the threaded portion of the adjustment element. If a worm gear pair is used, a particularly advantageous transmission ratio can be provided between the worm gear and worm, for example in a range from i=4:1 to 12:1, in one embodiment from i=6:1 to 10:1, in another embodiment i=9:1. Furthermore, a torque which has to be transmitted to the adjustment wheel is comparatively small and the position of the adjustment element can be adjusted in a particularly precise manner. In comparison with, for example, a bevel gear mechanism, the construction of the worm gear pair may be simpler and/or more cost-effective.

In order to prevent the head pressure which is provided by the pretensioning device from being inadvertently changed during operation, the pretensioning device can comprise a locking unit for locking the pretensioning device, for example for locking the adjustment wheel against rotation and/or for locking the adjustment element against displacement.

In several embodiments, the locking unit comprises a locking element which is movable relative to the adjustment wheel and a pretensioning element for pretensioning the locking element relative to the adjustment wheel.

Alternatively or additionally, the locking element may be in the form of a fork-like securing member.

If the apparatus according to another embodiment comprises a position detection unit for detecting the position of the adjustment element relative to the lifting unit, for example relative to the guide unit, a conclusion can be drawn relating to the head pressure provided by the pretensioning device via the detected position of the adjustment element. Thus, it is possible to monitor the head pressure during operation. Furthermore, it can be detected whether or when the adjusted head pressure is adjusted so that a comparatively high level of operational reliability is obtained.

In one or more embodiments, the position detection unit comprises a sensor which is constructed to detect the position of the adjustment element relative to the lifting unit, for example the guide unit, when viewed in the longitudinal direction. In this instance, the sensor can in some embodiments detect a spacing in the longitudinal direction of a plate which is arranged on the adjustment element relative to the sensor. In several embodiments, the sensor is arranged on a fixed level when viewed in the longitudinal direction. Alternatively, the sensor can also be arranged on the adjustment element and also move accordingly with the adjustment element in the longitudinal direction. The sensor is then in some embodiments constructed in such a manner that it detects a spacing in the longitudinal direction from a location with a fixed, constant height level in the longitudinal direction.

According to another embodiment, the adjustment apparatus is constructed so as to be able to be connected to the pretensioning device.

The term "so as to be able to be connected" includes in this instance the ability to connect and the ability to disconnect. In other words, a connectable unit can be connected to an apparatus for the purpose of an interaction with each other. In the connected state, for example, the unit can be arranged on the apparatus or secured thereto in such a manner that, for example, a transmission of force is possible in the longitudinal direction. Furthermore, disconnection corresponds to a release or removal of the unit from the apparatus.

According to another embodiment, the adjustment apparatus comprises a drive wheel which can be connected to the adjustment wheel of the pretensioning device, wherein the drive wheel is in certain embodiments in the form of a friction wheel, wherein the drive wheel is in some embodiments constructed to be able to move towards the adjustment wheel in order to connect to the adjustment wheel and to move away from the adjustment wheel in order to be disconnected.

According to another embodiment, the adjustment apparatus comprises a drive apparatus for automatically driving the adjustment apparatus, for example the drive wheel of the adjustment apparatus, wherein the drive apparatus in one embodiment comprises a motor, for example an electric motor, in one embodiment a stepping motor and/or a direct-current motor.

In order to provide a connection and disconnection of the adjustment apparatus with respect to the pretensioning device, the adjustment apparatus may comprise an actuator unit for displacing the drive wheel towards and away from the adjustment wheel. For connection, the drive wheel can be moved towards the adjustment wheel until the drive wheel and the adjustment wheel contact each other so that the drive wheel can drive the adjustment wheel.

Alternatively or additionally, the adjustment apparatus can comprise a release element for releasing the locking unit of the pretensioning device, wherein in some embodiments the release element is constructed so as to be able to be moved at the same time as the drive wheel, wherein in certain embodiments the release element is constructed to retain the locking unit in a released state if the drive wheel is positioned in a position connected to the adjustment wheel and is constructed not to act on the locking unit when the drive wheel is positioned in a position disconnected from the adjustment wheel, wherein the release element is in several embodiments arranged so as to be pretensioned, for example resiliently pretensioned, with respect to the drive wheel so as to be directed in the direction of the locking unit. Thus, it can be ensured that the drive wheel can drive the adjustment wheel in order to adjust the head pressure.

According to another embodiment, the apparatus comprises a control/regulation for controlling/regulating the head pressure which is predetermined by the pretensioning device. In certain embodiments, the control/regulation is constructed to control/regulate the position of the adjustment element relative to the lifting unit, preferably the guide unit, and/or a position of the adjustment apparatus relative to the pretensioning device, for example a position of the drive wheel relative to the adjustment wheel, and/or a rotational movement of the drive wheel. Alternatively or additionally, the control/regulation can be constructed to control/regulate the drive apparatus and/or the actuator unit and/or a position of the release unit.

In certain embodiments, the closure receiving member is releasably retained on the lifting unit. Thus, the closure receiving member can be replaced in a simple manner by another closure receiving member, for example, if the closure receiving member has been damaged or if another container closure type is intended to be processed.

The term "releasable" is intended to be understood in this instance similarly to the term "connectable" to be the possibility of releasing a unit from an apparatus, that is to say, to be able to disassemble it and to be able to fit it or mount it again. The lifting unit and the closure receiving member are accordingly constructed in such a manner that a release and repeated fitting are possible without thereby causing damage to the lifting unit and/or the closure receiving member. The release and the fitting are consequently reversible without any physical actions, such as separation and welding.

The object set out above is further achieved by a closure member for closing a container with a container closure, for example for closing a drinks container with a roll-on closure, a screw type closure, a press-on closure, a crown cap and/or a press-in closure, having the features of claim 13. Advantageous developments will be appreciated from the present description and the Figures.

Accordingly, a closure member is proposed for closing a container with a container closure, for example for closing a drinks container with a roll-on closure, a screw type closure, a press-on closure, a crown cap and/or a press-in closure, which comprises a rotatable closure carousel having a container receiving member for receiving a container which is intended to be closed.

The closure member further comprises an apparatus according to one of the preceding embodiments which is arranged on the closure carousel in a manner associated with the container receiving member.

In that the closure member comprises an apparatus for closing a container with a container closure according to one of the preceding embodiments, the advantages and effects mentioned above with respect to the apparatus can also be achieved by the closure member.

In one or more embodiments, the closure member may comprise a plurality of apparatuses. In this instance, each apparatus may have its own adjustment apparatus or be associated therewith, or an adjustment apparatus is provided for a plurality of apparatuses. For example, the closure member can comprise 52 apparatuses with 52 closure receiving members, wherein the closure member comprises a total of four adjustment apparatuses. Consequently, an adjustment unit is then associated with 13 apparatuses or 13 apparatuses "share" an adjustment unit. Thus, a simple construction of the closure member can be obtained with a retrofitting time which is acceptable at the same time.

BRIEF DESCRIPTION OF THE FIGURES

Additional embodiments of the invention will be explained in greater detail by the following description of the Figures.

DETAILED DESCRIPTION

Figure 1:
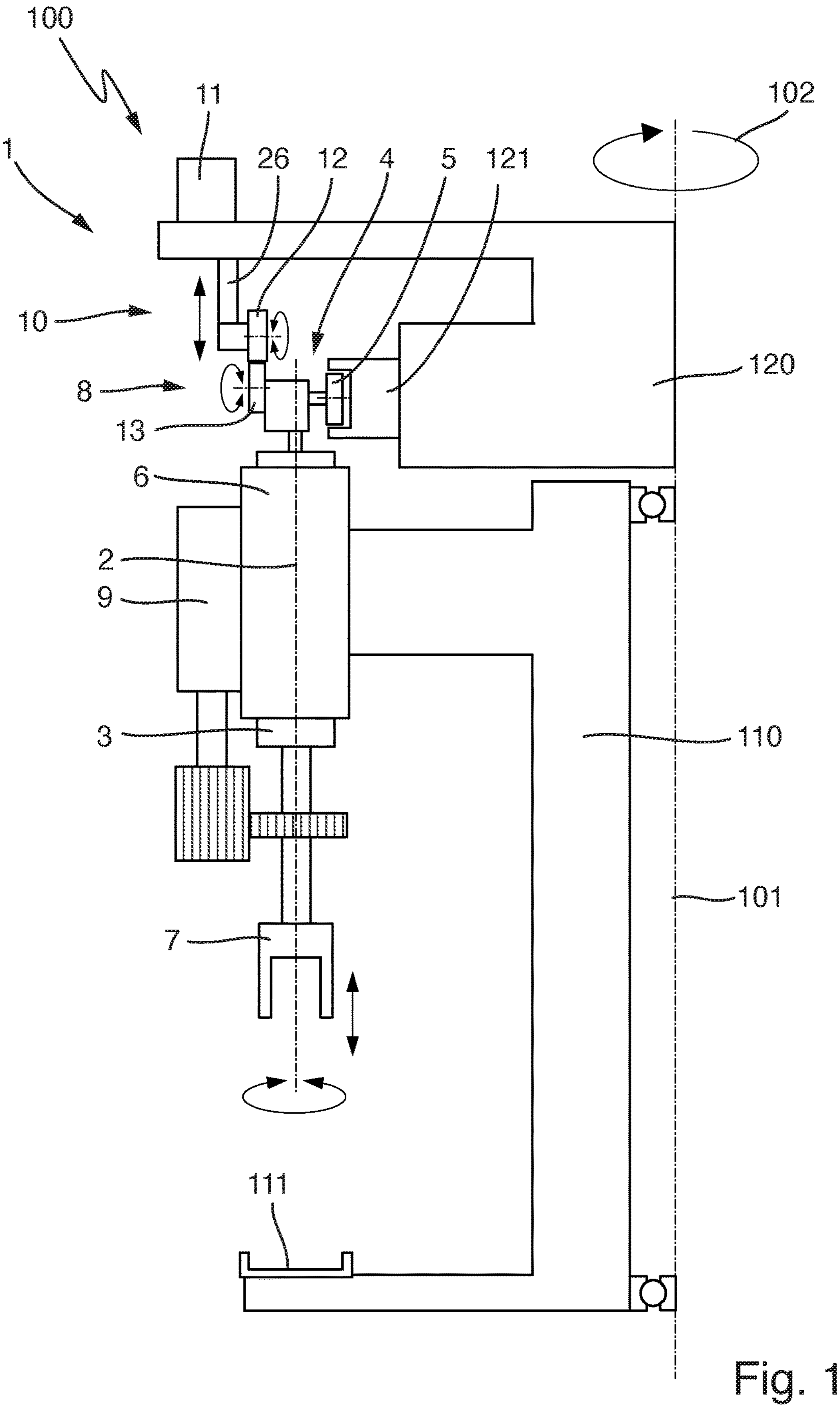
FIG. 1 schematically shows a sectioned view through a closure member for closing a container with a container closure.

Embodiments are described below with reference to the Figures. In this case, identical, similar or equivalent elements in the different Figures are denoted with the same reference numerals and a repeated description of these elements is partially dispensed with in order to avoid redundancy.

FIG. 1 schematically shows a sectioned view through a closure member 100 for closing a container (not shown) with a container closure (not shown). The closure member 100 is in the form of a rotary construction type. It accordingly comprises a closure carousel 110 which can be rotated relative to a base frame 120 which is rigidly connected to the base of the environment and which can be rotated relative to the base frame 120 about a central rotation axis 101 in a predetermined rotation direction 102, wherein only one side of the closure member 100 is indicated here for the sake of clarity.

The closure member 100 comprises a large number of container receiving members 111 which are for receiving a container which is intended to be closed and which are arranged on the closure carousel 110 relative to the rotation axis 101 in a circumferential direction. Each container receiving member 111 is associated with an apparatus 1 for closing a container with a container closure and is arranged above it.

During normal operation of the closure member 100, per revolution of the closure carousel 110 in each container receiving member 111 a container which is intended to be closed is received, is closed by means of the apparatus 1 which is associated with the container receiving member 111 and the container which is then closed is guided out of the container receiving member 111 in order to make space for the next container which is intended to be closed and which is then received in the next revolution. It is thereby possible to close a continuous flow of containers with the closure member 100.

The apparatus 1 comprises a lifting unit 3 which is retained on the closure carousel 110 in a displaceable manner in a longitudinal direction orientated parallel with the rotation axis 101 and which comprises a guide unit 4 for predetermining the position of the lifting unit 3 in the longitudinal direction 2 relative to the closure carousel 110. The guide unit 4 has to this end a guide element 5 in the form of a running roller which is guided along a lifting cam 121 which is provided on the base frame 120.

In order to allow the displaceability of the lifting unit 3 with respect to the closure carousel 110, the apparatus 1 comprises a retention member 6 which is securely arranged on the closure carousel 110 and on which the lifting unit 3 is displaceably retained in the longitudinal direction 2.

The apparatus 1 further comprises a closure receiving member 7 which is arranged on the lower side of the lifting unit 3 and which is connected to the lifting unit 3 via a pretensioning apparatus 8 which is described in detail below. The closure receiving member 7 is constructed to retain a container closure and to apply the container closure to a container opening, which is intended to be closed, of the container which is retained in the container receiving member 111. As a result of the pretensioning device 8, the application of the container closure to the container opening of the container via the closure receiving member 7 can be carried out with a predetermined head pressure which is provided by the pretensioning device 8.

An optional drive 9, via which the closure receiving member 7 can be rotated about the longitudinal direction 2, is provided on the retention member 6.

The apparatus further comprises an adjustment apparatus 10 which is arranged on the base frame 120 of the closure member 100 for automatically adjusting or changing the head pressure which is predetermined by the pretensioning device 8. The adjustment apparatus 10 comprises a drive apparatus 11, by means of which a drive wheel 12 of the adjustment apparatus 10 can be rotated.

The drive wheel 12 is connected to an adjustment wheel 13 of the pretensioning device 8 in such a manner that rotation of the drive wheel 12 brings about rotation of the adjustment wheel 13, as explained in greater detail below.

The adjustment wheel 13 being rotated brings about a change of the head pressure which is provided by the pretensioning device 8.

As indicated in FIG. 1, at least the drive wheel 12 of the adjustment apparatus 10 is displaceably constructed in the longitudinal direction 2. If the drive wheel 12 is moved away from the adjustment wheel 13, the drive wheel 12 and adjustment wheel 13 are disconnected from each other.

Thus, the lifting unit which is arranged on the closure carousel 110 can be moved with the pretensioning device 8 past the adjustment apparatus 10 in the direction of the rotation direction 102 without any contact being produced between the drive wheel 12 and the adjustment wheel 13, which contact could bring about an adjustment of the orientation of the adjustment wheel 13, consequently a rotation of the adjustment wheel 13.

If an adjustment of the head pressure is provided, initially the adjustment wheel 13 is arranged under the drive wheel 12 when viewed in the longitudinal direction 2 and subsequently the drive wheel 12 is moved towards the adjustment wheel 13 until they are in a connected state. The adjustment wheel 13 can then be moved by moving the drive wheel 12.

In order to provide the displacement of the drive wheel 12, the adjustment apparatus 10 comprises an actuator unit 26.

Figure 2:
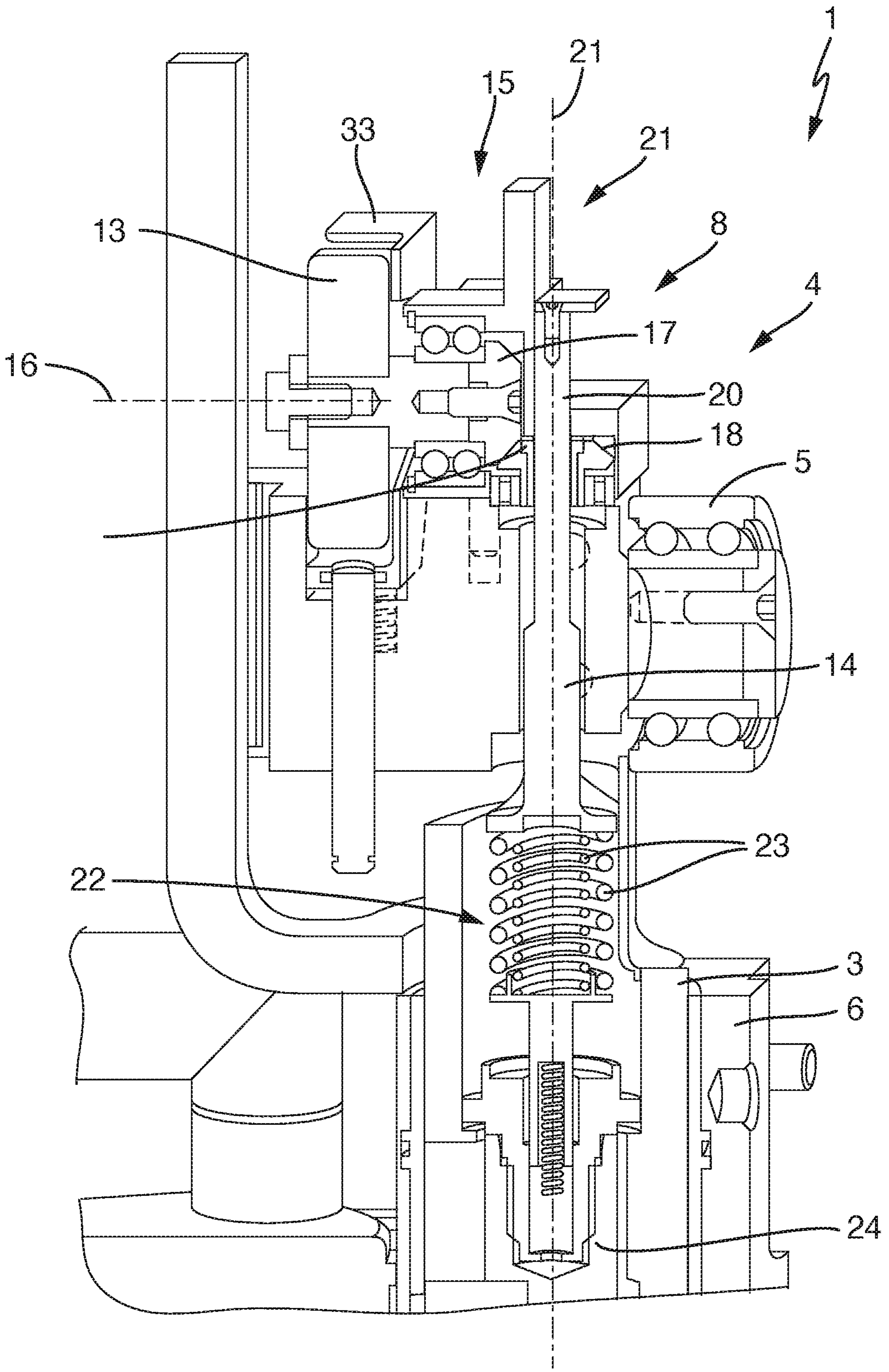
FIG. 2 schematically shows a sectioned view of a portion of an apparatus for closing a container with a container closure of the closure member from FIG. 1.

FIG. 2 schematically shows a sectioned view of a portion of the apparatus 1 from FIG. 1. The sectioned view in FIG. 2 shows a portion of the lifting unit 3 which is retained on the retention member 6. Furthermore, the guide unit 4 with the guide element 5 thereof and the pretensioning device 8 can be seen in detail.

The guide unit 4 is fixedly connected to the lifting unit 3 or securely attached thereto.

The pretensioning device 8 comprises an adjustment element 14, which is displaceable in the longitudinal direction 2 relative to the lifting unit 3 and which is guided in the guide unit 4, and a gear mechanism 15 which is arranged between the adjustment wheel 13 and the adjustment element 14 and which provides a connection of the adjustment wheel 13 and the adjustment element 14 in such a manner that rotation of the adjustment wheel 13 about a rotation axis 16, which is orientated perpendicularly to the longitudinal direction 2, of the adjustment wheel 13 brings about displacement of the adjustment element 14 in the longitudinal direction 2.

To this end, the gear mechanism 15 is in the form of a bevel gear mechanism 15 which comprises a first bevel gear 17 which is rotationally connected to the adjustment wheel 13 and which can be rotated about the rotation axis 16 and a second bevel gear 18 which is rotatable about the longitudinal direction 2 and which is engaged with the first bevel gear 17. The second bevel gear 18 comprises an internal threaded member 19 which is engaged with an external threaded portion 20 of the adjustment element 14.

A rotation prevention member 21 which prevents the adjustment element 14 from being rotated about the longitudinal direction 2 is provided at the upper end of the adjustment element 14 in FIG. 2.

Accordingly, rotation of the adjustment wheel 13 about the rotation axis 16 brings about displacement of the adjustment element 14 in the longitudinal direction 2.

In order to prevent the adjustment wheel 13 and the adjustment element 14 from moving inadvertently, there is provided a locking unit 33 which locks the adjustment wheel 13 against rotation as described in greater detail below.

The pretensioning device 8 further comprises a compression spring element 22 which is constructed in this instance by two compression springs 23 which act in a parallel manner. The compression spring element 22 is arranged between the adjustment element 14 and the closure receiving member 7. The closure receiving member 7 (see FIG. 1) comprises to this end a connection cylinder 24 which extends in the longitudinal direction 2 in the lifting unit 3 and which is in contact with the end of the compression spring element 22 on the closure receiving member 7.

If the adjustment element 14 is moved towards the connection cylinder 24, the compression spring element 22 is subjected to (additional) compression so that the pretensioning which is applied by the pretensioning device 8 to the closure receiving member 7 increases, more specifically the pretensioning force which acts as a result of the pretensioning device 8 in the direction of the closure receiving member 7. If the adjustment element 14 moves away from the connection cylinder 24, the pretensioning force is reduced accordingly. The pretensioning force which is provided by the pretensioning device 8 is proportional to the head pressure provided, as is commonplace to a person skilled in the art.

Figure 3:
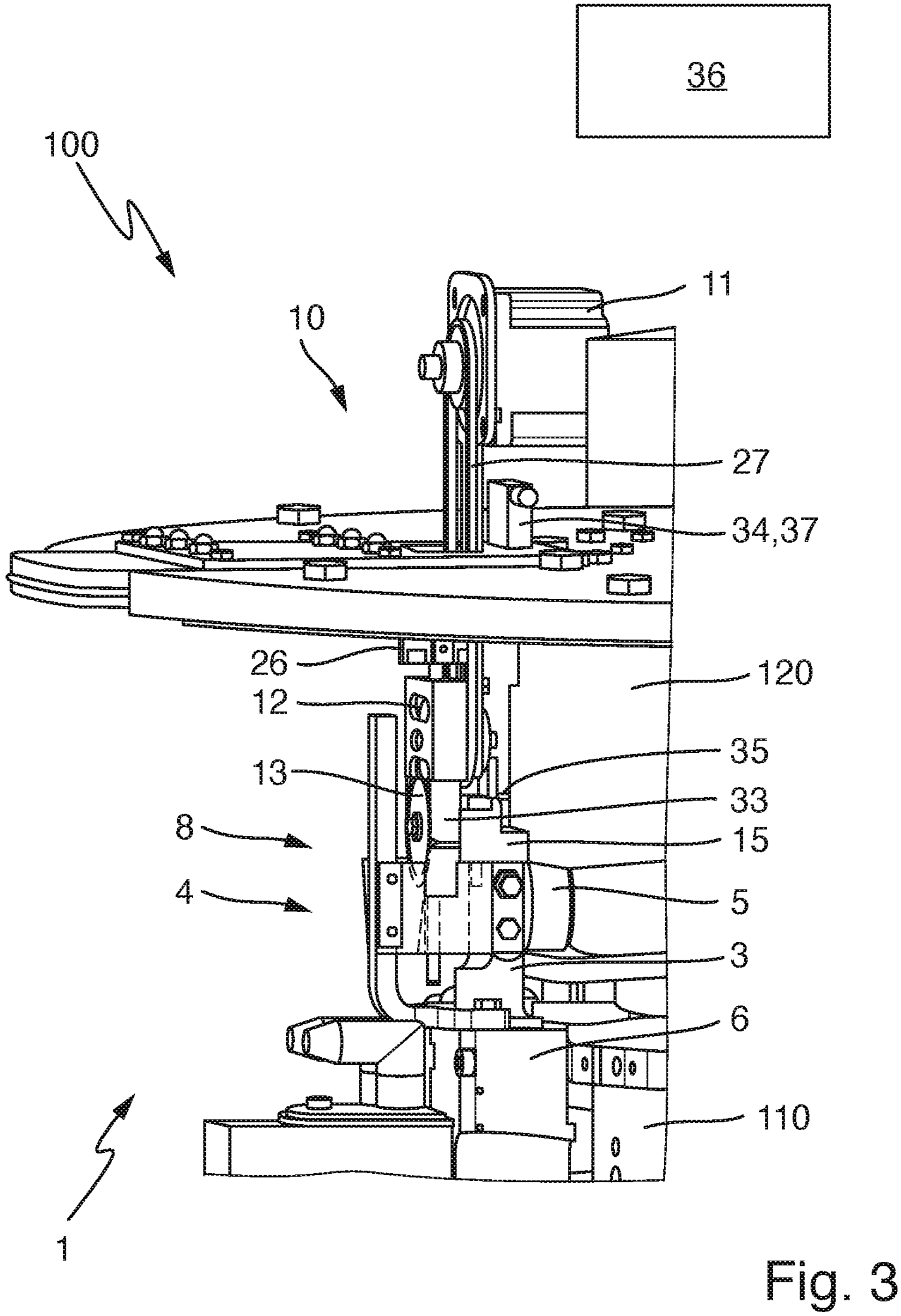
FIG. 3 schematically shows a perspective sectioned view of a part-region of the closure member from FIG. 1.

FIG. 3 schematically shows a perspective sectioned view of a part-region of the closure member 100 from FIG. 1, wherein the drive wheel 12 is rotationally connected to the adjustment wheel 13, consequently the adjustment apparatus 10 and the pretensioning device 8 are in a state connected to each other.

The drive wheel 12 is connected to the drive apparatus 11 via a chain drive 27.

The apparatus 1 further comprises a position detection unit 34 for detecting the position of the adjustment element 14 relative to the lifting unit 3. A sensor 37 of the position detection unit 34 is arranged on the base frame 120 which establishes the spacing in the longitudinal direction 2 between itself and a sensor plate 35 which is arranged on the adjustment element 14.

FIG. 3 further indicates a control/regulation 36 which is configured to control/regulate the head pressure which is predetermined by the pretensioning device 8. According to this embodiment, the control/regulation 36 is connected to the actuator unit 26, the position detection unit 34 and the drive apparatus 11 and constructed to control/regulate the position of the adjustment element 14 relative to the lifting unit 3.

As a result of the position of the adjustment element 14 relative to the lifting unit 3, a conclusion can be drawn relating to the head pressure or it can be calculated. Accordingly, the control/regulation can establish a position of the adjustment element 14 corresponding to a predetermined head pressure which is intended to be adjusted and automatically move the adjustment element 14 to the required position by controlling/regulating the drive apparatus 11.

Figure 4:
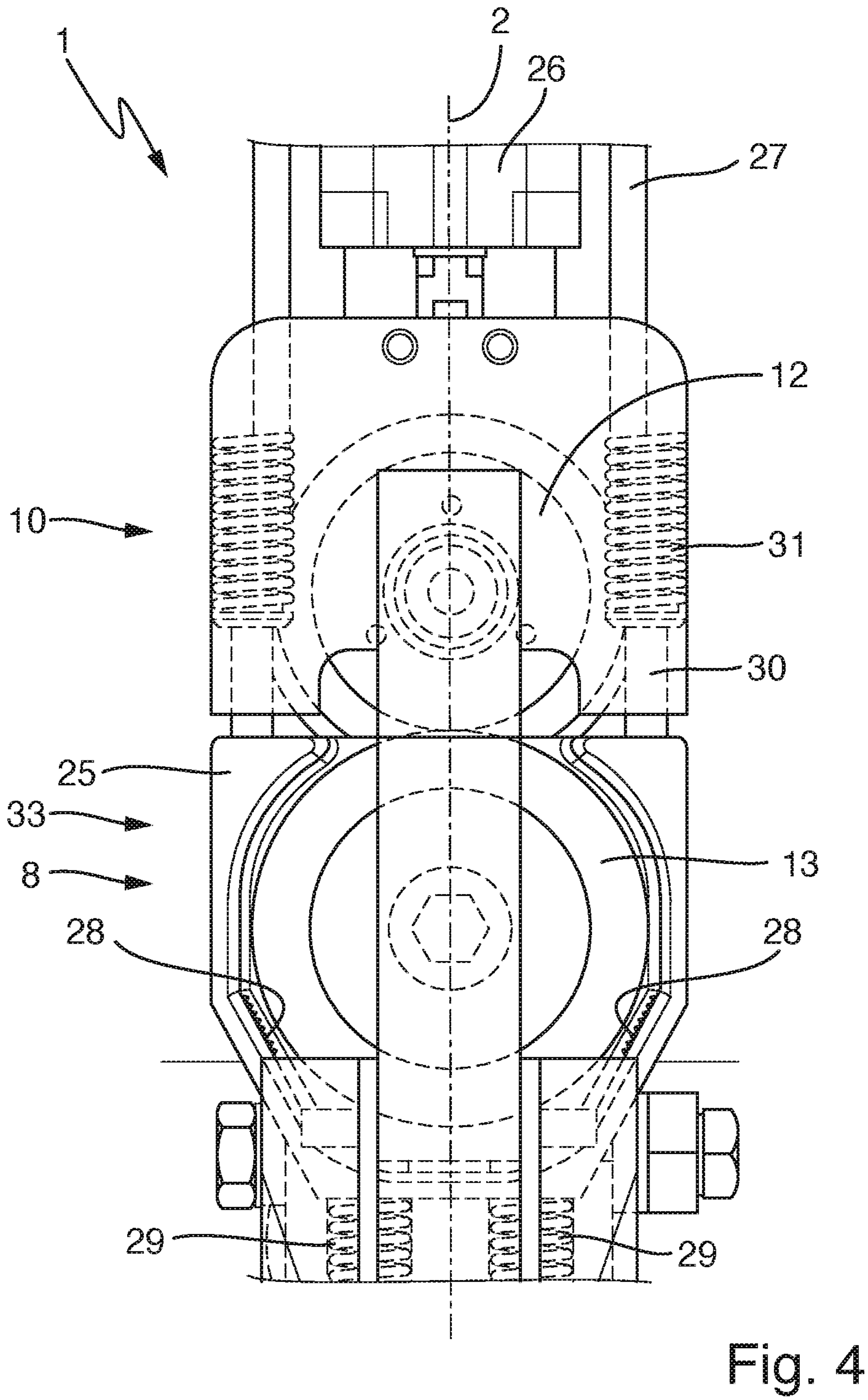
FIG. 4 schematically shows a side view of a detail of the apparatus according to FIGS. 1 to 3.

FIG. 4 schematically shows a side view of a detail of the apparatus 1 according to FIGS. 1 to 3 in the region around the drive wheel 12 and the adjustment wheel 13, wherein the drive wheel 12 and the adjustment wheel 13 are in the connected state.

The drive wheel 12 and the adjustment wheel 13 are in the form of a friction wheel in each case. Accordingly, a transmission of the torque from the drive wheel 12 to the adjustment wheel 13 is carried out by a friction force or a friction moment. To this end, the actuator unit 26 presses the drive wheel 12 with a predetermined pressing force against the adjustment wheel 13.

It can be seen here that the locking unit 33 has a locking element 25 in the form of a fork-like securing member with opposing contact faces 28 which are directed in the direction of the adjustment wheel 13 and with which the locking unit 33 can be brought into contact with the adjustment wheel 13. The locking element 25 is pretensioned by means of pretensioning elements in the form of springs 29 in the direction of the adjustment wheel 13. This pretensioning causes the locking element 25 to be pressed with the contact faces 28 onto the external circumferential face of the adjustment wheel 13 and the adjustment wheel thus to be locked against rotation.

The adjustment apparatus 10 comprises a release element 30 for releasing the locking action, provided by the locking unit 33, of the adjustment wheel 13 which is constructed for simultaneous movement with the drive wheel 12 and which is pretensioned by means of a spring 31 in the direction of the locking unit 33.

Alternatively or additionally to the spring 31, an actuator, for example a pneumatic cylinder, a hydraulic cylinder or a linear motor, can also be provided to actively move the release element 30 in the longitudinal direction 2 relative to the drive wheel 12.

Since the drive wheel 12 is in the state connected to the adjustment wheel 13, the release element 30 is in a state, in which it has moved the locking element 25 in the longitudinal direction 2 counter to the pretensioning provided by the springs 29 so that the contact faces 28 and the adjustment wheel 13 are moved out of engagement. It is thereby possible to rotate the adjustment wheel 13.

The state shown in FIG. 4 consequently corresponds to the connected state of the adjustment apparatus 10 and the pretensioning device 8 relative to each other.

Figure 5:
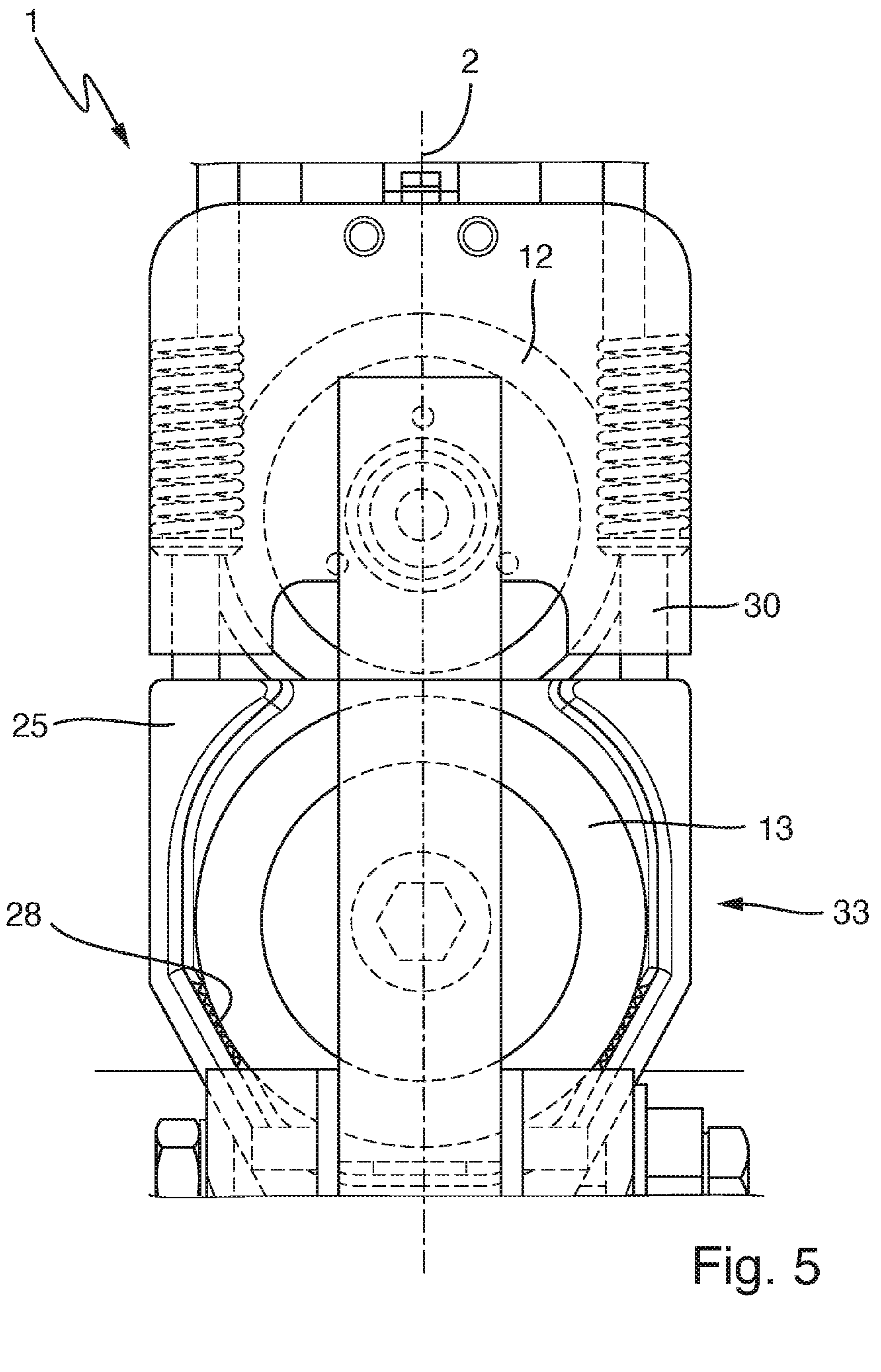
FIG. 5 schematically shows another side view of the detail of the apparatus from FIG. 4.

FIG. 5 schematically shows the detail of the apparatus 1 from FIG. 4, wherein the drive wheel 12 has been moved away from the adjustment wheel 13 by means of the actuator unit 26 in the longitudinal direction so that there is no contact between the drive wheel 12 and adjustment wheel 13 any more and consequently no connection any more.

As a result of the pretensioning by the springs 31, the release elements 30 are still in contact with the locking unit 33, but have already been lifted by a specific amount in the longitudinal direction 2 so that the contact faces 28 are again in contact with the adjustment wheel 13 and thus lock the adjustment wheel 13 against rotation.

The state shown in FIG. 5 of the adjustment apparatus 10 and pretensioning device 8 relative to each other consequently corresponds to an intermediate state between the connected state and a disconnected state.

Figure 6:
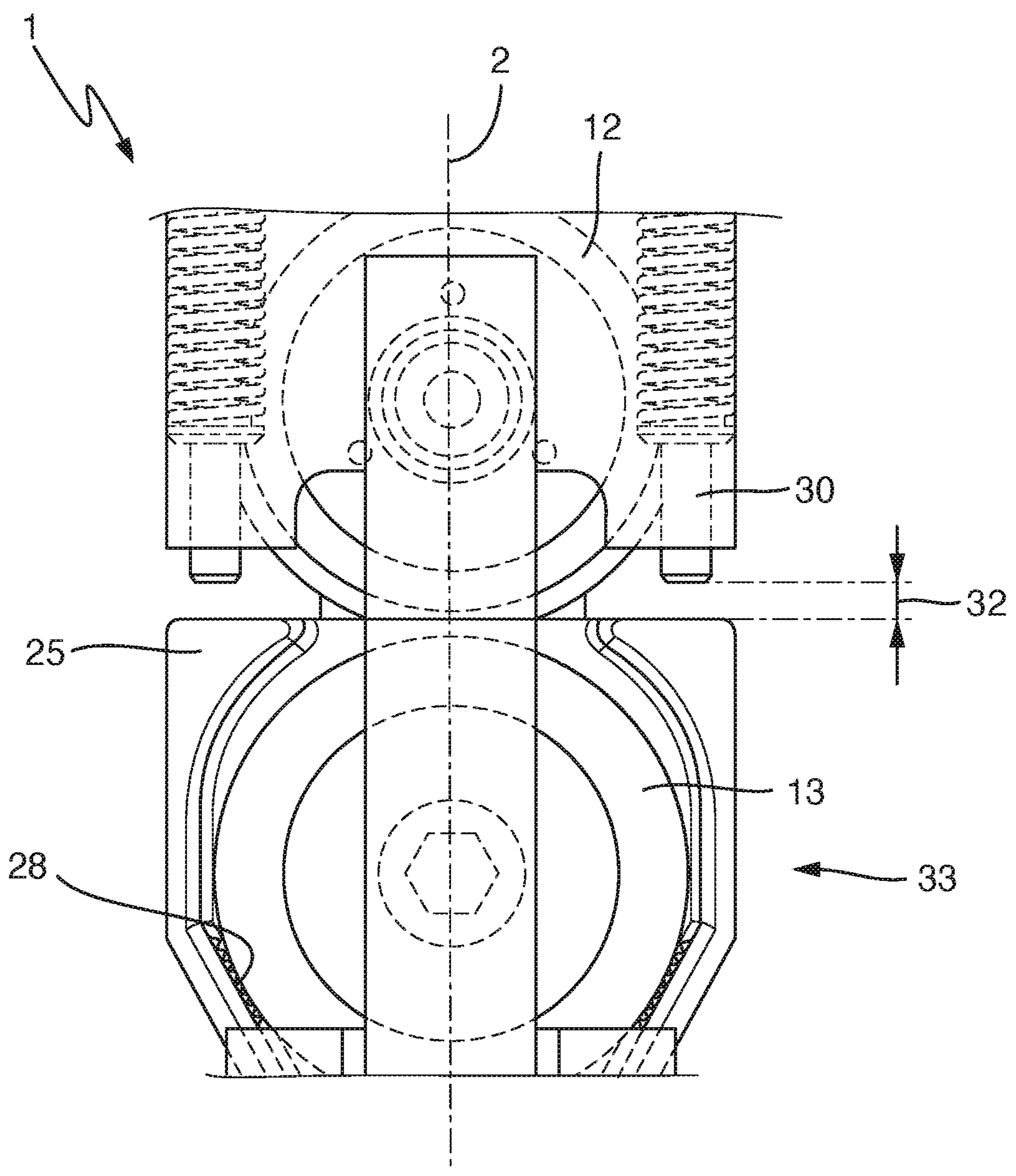
FIG. 6 schematically shows another side view of the detail of the apparatus from FIG. 4.

FIG. 6 schematically shows the detail of the apparatus 1 from FIG. 4, wherein the adjustment apparatus 10 is in a state disconnected from the pretensioning device 8. Accordingly, both the drive wheel 12 and the release elements 30 of the adjustment wheel 13 or the locking unit 33 are moved out of engagement.

A predetermined spacing 32 is provided between the lower side of the release elements 30 and the upper side of the locking unit 33.

The state shown in FIG. 6 consequently corresponds to the disconnected state of the adjustment apparatus 10 and pretensioning device 8 relative to each other.

Figure 7:
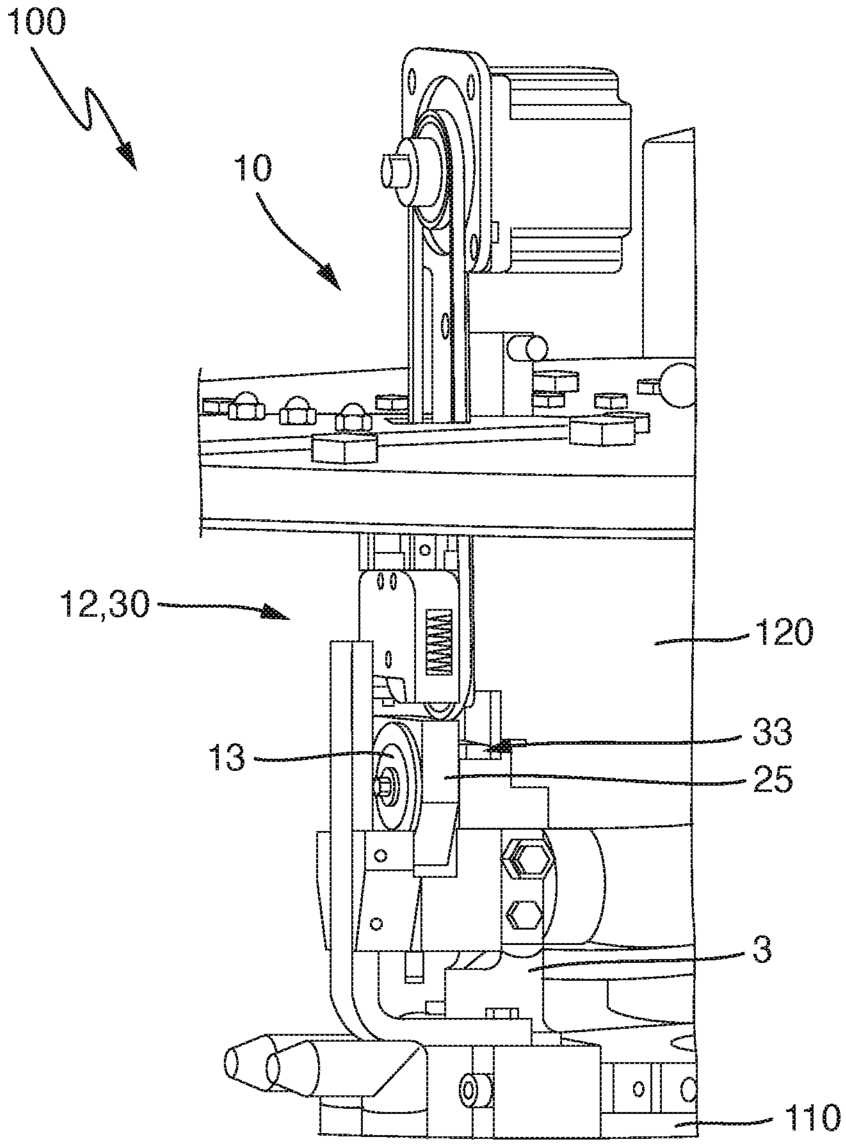
FIG. 7 schematically shows a perspective side view of the part-region from FIG. 3.

FIG. 7 schematically shows a perspective side view of the part-region from FIG. 3, wherein the adjustment apparatus 10, more specifically the drive wheel 12 and the release elements 30, of the pretensioning device 8, more specifically the drive wheel 8 and the locking unit 33, are in the disconnected state according to FIG. 6.

Figure 8:
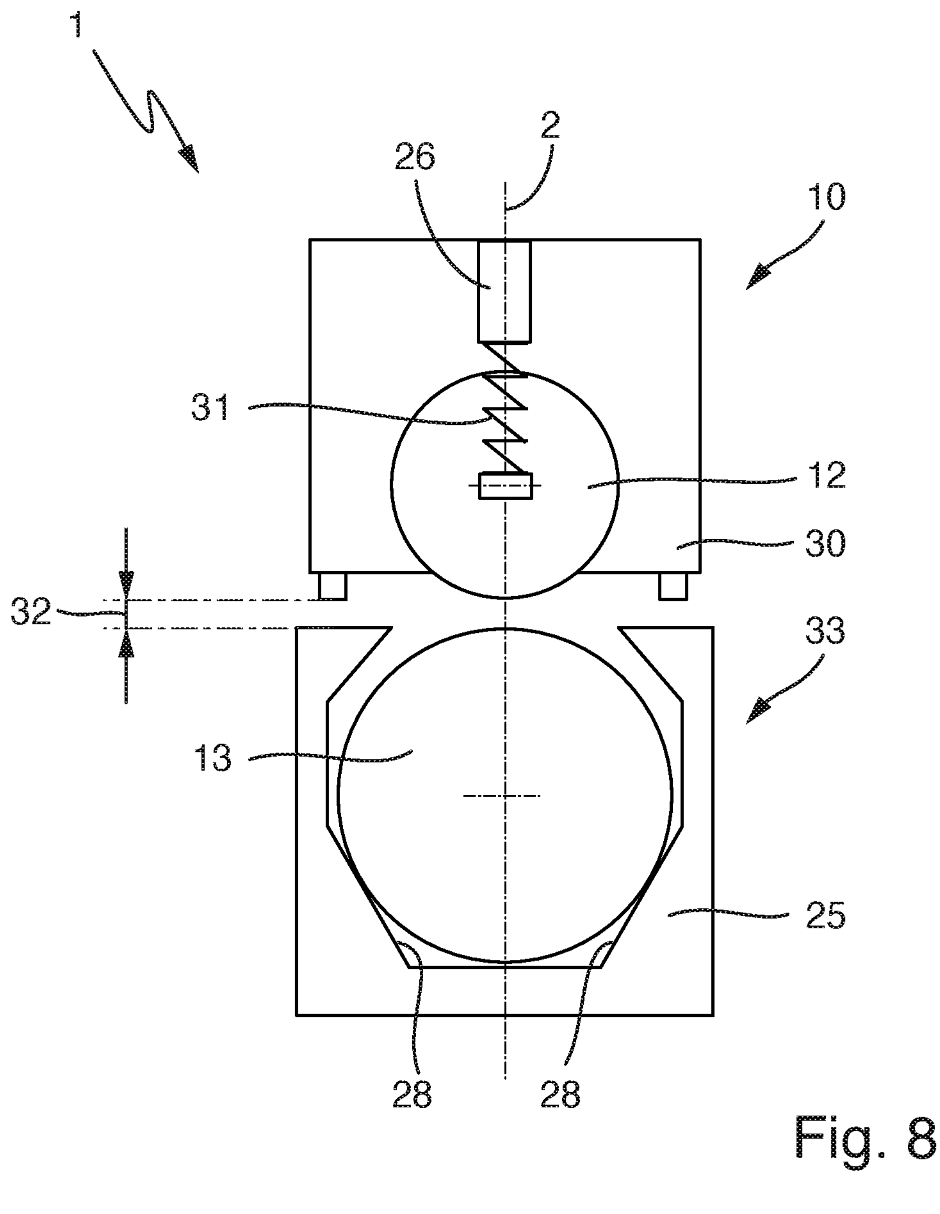
FIGS. 8 to 10 schematically show a side view of a detail of an apparatus for closing a container with a container closure according to another embodiment.
Figure 9:
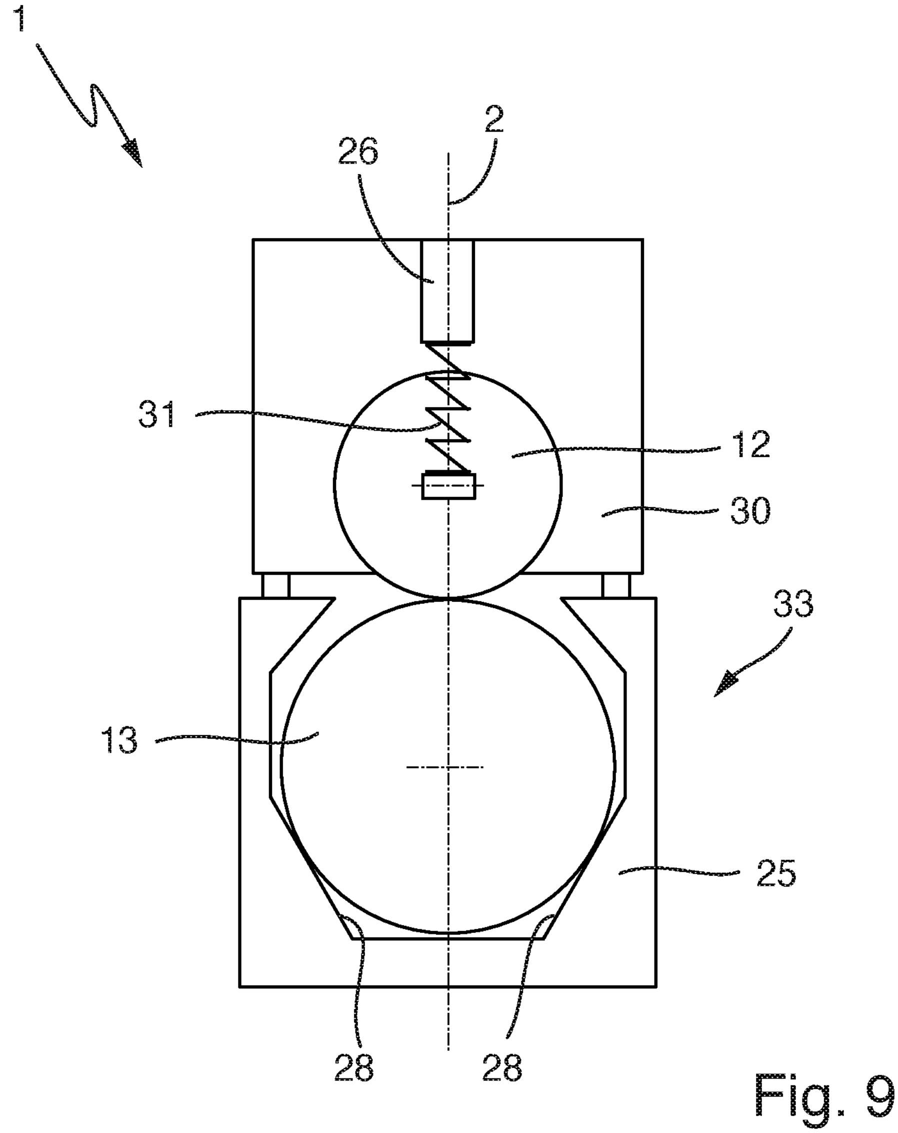
Figure 10:
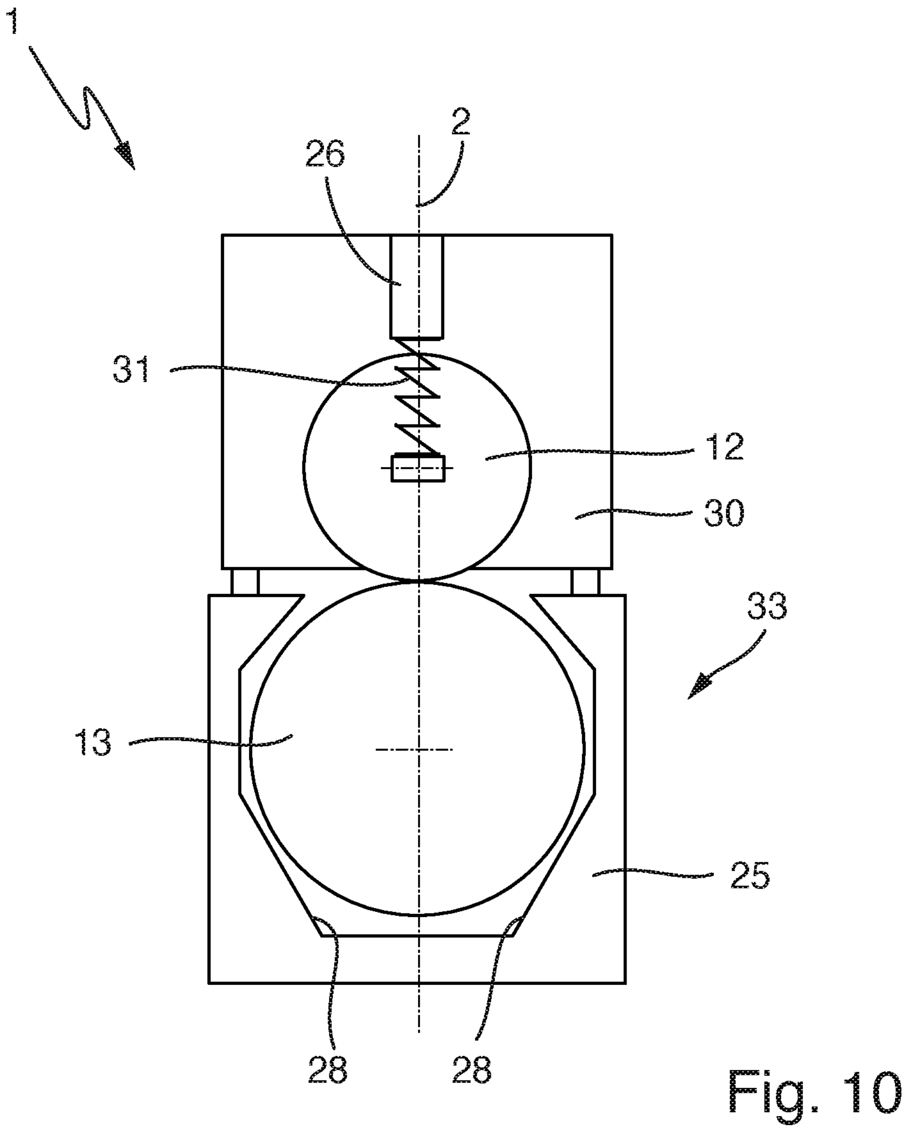

FIGS. 8 to 10 schematically show a side view of a detail similar to the detail from FIGS. 4 to 6 of an apparatus 1 for closing a container with a container closure according to another embodiment. The apparatus 1 of FIGS. 8 to 10 substantially corresponds to that of FIGS. 1 to 7, wherein the adjustment apparatus 10 has a number of differences. Only these differences will be discussed below.

Unlike the embodiment described above, here the drive wheel 12 is pretensioned via a spring 31 against the actuator unit 26 and the release element 30 in the direction of the adjustment wheel 13. The release element 30 is directly connected to the actuator unit 26, consequently without any pretensioning as in the above-described embodiment.

In FIG. 8, the adjustment apparatus 10 and the pretensioning device 8 are in the disconnected state, accordingly with the predetermined spacing 32 from each other.

In FIG. 9, the release element 30 and the drive wheel 12 are moved towards the adjustment wheel 13 in the longitudinal direction 2 until the drive wheel 12 moves into contact with the adjustment wheel 13 for the first time. According to this embodiment, the release element 30 is simultaneously placed on the locking element 25 but without having already moved it in the longitudinal direction 2. The contact faces 28 of the locking element 25 consequently continue to be in contact with the adjustment wheel 13 and lock it against rotation. Consequently, the state shown in FIG. 9 constitutes an intermediate state similar to FIG. 5.

FIG. 10 shows the connected state between the adjustment apparatus 10 and the pretensioning device 8. In this state, an automatic adjustment of the head pressure provided by the pretensioning device 8 is possible.

In comparison with FIG. 9, the release element 30 has been moved via the actuator unit 26 further in the direction of the adjustment wheel 13 so that the locking element 25 has been displaced in the longitudinal direction 2 and is no longer in contact with the adjustment wheel 13 by means of the contact faces 28 thereof. Accordingly, it is possible to rotate the adjustment wheel 13.

The drive wheel 12 is pressed against the adjustment wheel 13 via the spring 31. The drive force which is necessary to transmit the friction moment is thereby provided. In some embodiments, the spring 31 is in the form of a mechanical spring, as indicated in FIG. 9, and/or a pneumatic spring 31, for example in the form of a pneumatic cylinder. Alternatively or additionally to the spring 31, an actuator can also be provided to actively move the release element 30 as described in relation to FIG. 4.

In this embodiment, the adjustment wheel 13 is always in contact either with the contact faces 28 or the drive wheel 12, therefore it is at no time freely rotatable. An undesirable adjustment of the angular position of the adjustment wheel 13, for example, as a result of vibrations, after it has lost contact with the contact faces 28 and before it achieves contact with the drive wheel 12 is consequently prevented.

Figure 11:
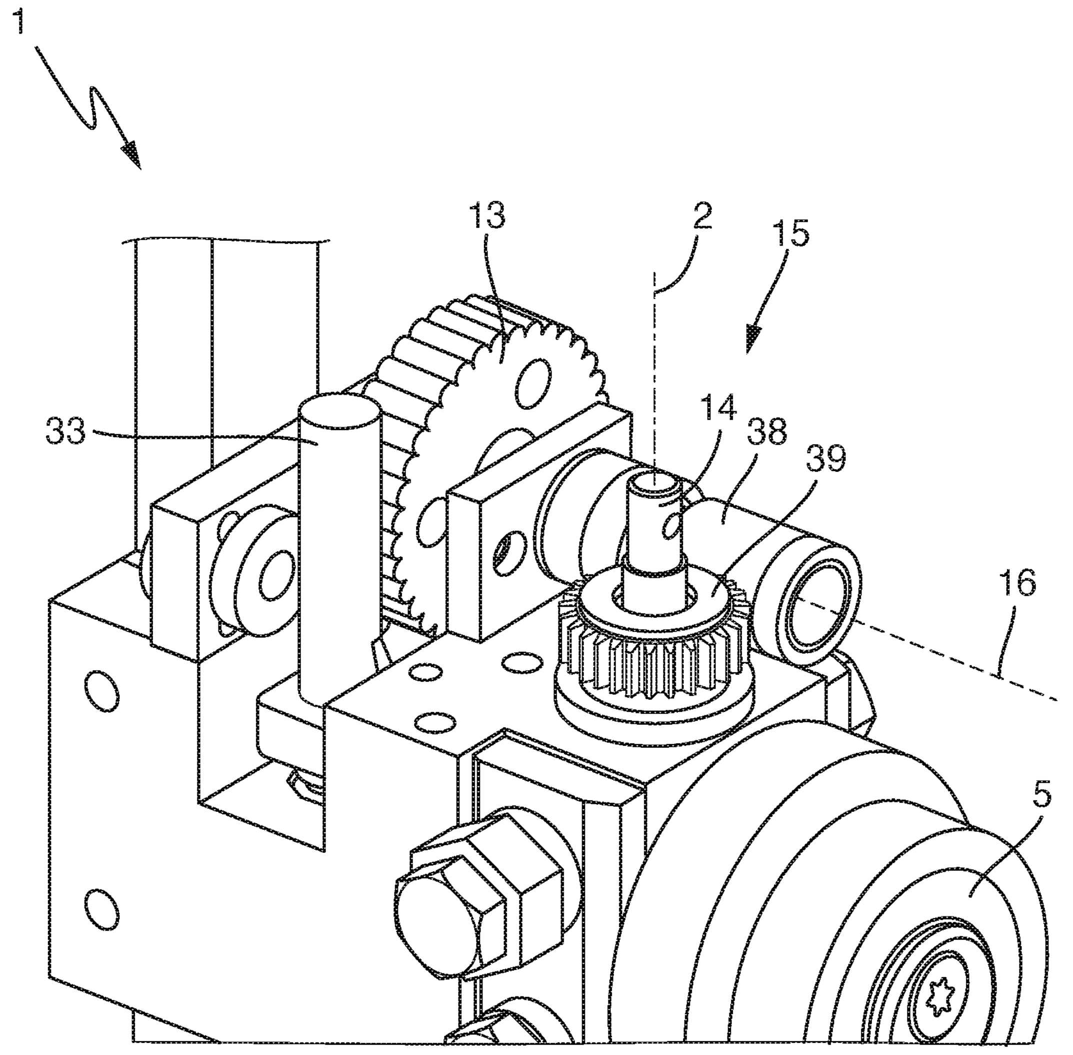
FIG. 11 schematically shows a perspective side view of a detail of an apparatus for closing a container with a container closure according to another embodiment.

FIG. 11 schematically shows a perspective side view of a detail of an apparatus 1 for closing a container with a container closure according to another embodiment. The apparatus 1 substantially corresponds to the one of FIGS. 1 to 3. It differs from the apparatus 1 from FIG. 1 in terms of the type of gear mechanism 15 used to connect the adjustment wheel 13 to the adjustment element 14. Furthermore, the adjustment wheel 13 is in the form of a friction wheel which is provided with a tooth arrangement here.

As can be seen in FIG. 11, the gear mechanism 15 in this embodiment is in the form of a worm gear mechanism 15 which provides the connection of the adjustment wheel 13 and the adjustment element 14 in such a manner that rotation of the adjustment wheel 13 about the rotation axis 16, orientated perpendicularly to the longitudinal direction 2, of the adjustment wheel 13 brings about displacement of the adjustment element 14 in the longitudinal direction 2.

To this end, a worm 38, orientated in the direction of the rotation axis 16, of the worm gear mechanism 15 is provided at the side of the adjustment wheel 13 or rotationally connected thereto. The worm 38 is in engagement with a worm gear 39 which is arranged at the side of the adjustment element 14.

The worm gear 39 comprises, similarly to FIG. 2, an internal threaded member 19 which is not shown here and which is in engagement with the external threaded portion 20 of the adjustment element 14.

According to this optional embodiment, the transmission ratio of the worm gear pair is 9 to 1.

If applicable, all the individual features which are set out in the embodiments can be combined with each other and/or replaced with each other without departing from the scope of the invention.

What is claimed is:

1. An apparatus for closing a container with a container closure, comprising:

a lifting unit configured to be displaced in a longitudinal direction and comprising a guide unit configured to predetermine a position of the lifting unit in the longitudinal direction;

a closure receiving member that is connected to the lifting unit via a pretensioning device, wherein the closure receiving member is configured to retain the container closure and to apply the container closure to a container opening of the container, which is to be closed with a head pressure that is predetermined by the pretensioning device, and the pretensioning device comprises an adjustment wheel configured to adjust the predetermined head pressure and an adjustment element displaceable in the longitudinal direction relative to the lifting unit; and an adjustment apparatus configured to automatically adjust the predetermined head pressure.

2. The apparatus of claim 1, further comprising a retention member configured to connect to a closure carousel, wherein the lifting unit is arranged on the retention member so as to be displaceable in the longitudinal direction.

3. The apparatus of claim 1, wherein:

the pretensioning device further comprises a compression spring element that is arranged between the adjustment element and the closure receiving member and provides the predetermined head pressure on the closure receiving member, a position of the adjustment element in the longitudinal direction is adjustable by the adjustment apparatus, the pretensioning device is arranged on the guide unit, and/or the adjustment element is retained on the guide unit in a displaceable manner.

4. The apparatus of claim 3, wherein:

the adjustment element is in a form of an adjustment rod, the adjustment element comprises a threaded portion via which the adjustment element is engaged with a threaded member of the pretensioning device, and/or the adjustment element is retained in a rotationally secure manner relative to the longitudinal direction on the lifting unit.

5. The apparatus of claim 4, wherein the adjustment element is retained in a rotationally secure manner relative to the longitudinal direction on the guide unit of the lifting unit via a pin that is guided in a groove in the lifting unit.

6. The apparatus of claim 1, wherein:

the adjustment wheel is further configured to adjust a position of the adjustment element in the longitudinal direction relative to the lifting unit, and/or the adjustment wheel and the adjustment element are connected in such a manner that the adjustment element is displaceable relative to the lifting unit by the adjustment wheel being rotated.

7. The apparatus of claim 1, wherein the adjustment wheel is in a form of a friction wheel, a wheel comprising a fluting, and/or a wheel comprising a tooth arrangement.

8. The apparatus of claim 1, wherein:

the pretensioning device further comprises a gear mechanism, the gear mechanism is arranged between the adjustment wheel and the adjustment element, the gear mechanism provides a connection of the adjustment wheel and the adjustment element, and/or a gearwheel of the gear mechanism comprises a threaded member engaged with a threaded portion of the adjustment element.

9. The apparatus of claim 8, wherein:

the gear mechanism comprises a bevel gear mechanism, a worm gear pair, or a crosswise belt gear mechanism, and the gearwheel further comprises a bevel gear or a worm gear.

10. The apparatus of claim 1, wherein:

the pretensioning device further comprises a locking unit configured to lock the pretensioning device, the locking unit comprises a locking element that is movable relative to the adjustment wheel, and a pretensioning element configured to pretension the locking element relative to the adjustment wheel, and/or the locking element is in a form of a fork-like securing member.

11. The apparatus of claim 10, wherein:

the locking unit is further configured to lock the adjustment wheel against rotation and/or to lock the adjustment element against displacement, and the pretensioning element comprises a spring.

12. The apparatus of claim 1, wherein:

the apparatus further comprises a position detection unit configured to detect a position of the adjustment element relative to the lifting unit, and the position detection unit comprises a sensor configured to detect the position of the adjustment element relative to the lifting unit when viewed in the longitudinal direction.

13. The apparatus of claim 1, wherein:

the adjustment apparatus is further configured to connect to the pretensioning device, the adjustment apparatus comprises a drive wheel connectable to the adjustment wheel of the pretensioning device, the drive wheel is in a form of a friction wheel, a wheel provided with a fluting, and/or a tooth arrangement, the drive wheel is configured to move towards the adjustment wheel to connect to the adjustment wheel and to move away from the adjustment wheel to be disconnected.

14. The apparatus of claim 13, wherein:

the adjustment apparatus further comprises a drive apparatus configured to automatically drive the adjustment apparatus, and the drive apparatus comprises a motor.

15. The apparatus of claim 14, wherein the adjustment apparatus further comprises an actuator unit configured to displace the drive wheel towards and away from the adjustment wheel.

16. The apparatus of claim 14, wherein:

the pretensioning device further comprises a locking unit configured to lock the pretensioning device, the adjustment apparatus further comprises a release element configured to release the locking unit of the pretensioning device, the release element is movable at the same time as the drive wheel, the release element is configured to retain the locking unit in a released state when the drive wheel is positioned in a position connected to the adjustment wheel, and is configured not to act on the locking unit when the drive wheel is positioned in a position disconnected from the adjustment wheel, and the release element is pretensioned with respect to the drive wheel so as to be directed in a direction of the locking unit.

17. The apparatus of claim 1, further comprising a control/regulation configured to control or regulate the predetermined head pressure, wherein:

the control/regulation is further configured to control or regulate a position of the adjustment element relative to the lifting unit.

18. The apparatus of claim 1, wherein the closure receiving member is releasably retained on the lifting unit.

19. A closure member for closing a container with a container closure, comprising:

a rotatable closure carousel having a container receiving member configured to receive the container; and an apparatus arranged on the rotatable closure carousel in a manner associated with the container receiving member, wherein the apparatus comprises:

a lifting unit configured to be displaced in a longitudinal direction and comprising a guide unit configured to predetermine a position of the lifting unit in the longitudinal direction;

a closure receiving member that is connected to the lifting unit via a pretensioning device, wherein the closure receiving member is configured to retain the container closure and to apply the container closure to a container opening of the container, which is to be closed with a head pressure that is predetermined by the pretensioning device, and the pretensioning device comprises an adjustment wheel configured to adjust the predetermined head pressure and an adjustment element displaceable in the longitudinal direction relative to the lifting unit; and an adjustment apparatus configured to automatically adjust the predetermined head pressure.

* * * * *